Dec. 18, 1934.　　　G. T. MARLOWE　　　1,984,803
BATTERY FILLER
Filed April 10, 1933　　2 Sheets-Sheet 1

Inventor
Glenn T. Marlowe
by J. W. Adams
ATTORNEY

Dec. 18, 1934.                G. T. MARLOWE                 1,984,803
                               BATTERY FILLER
                     Filed April 10, 1933        2 Sheets-Sheet 2

Inventor
Glenn T. Marlowe
by J. H. Adams
ATTORNEY

Patented Dec. 18, 1934

1,984,803

UNITED STATES PATENT OFFICE 1,984,803

BATTERY FILLER

Glenn T. Marlowe, Vallejo, Calif., assignor to Standard Stations, Incorporated, San Francisco, Calif., a corporation of Delaware Application April 10, 1933, Serial No. 665,323

5 Claims. (Cl. 226—39)

This invention relates to a portable battery filler which is used in adding water to the electrolyte of conventional storage batteries of the kind used in automobiles. It is also useful for withdrawing electrolyte in case of overfilling.

Heretofore the operation of adding distilled water to a storage battery or removing excess electrolyte therefrom has been carried out by means of a conventional syringe, consisting of a flexible rubber bulb with a long hollow stem, through which liquid may be drawn into the bulb and ejected into the battery cell or other receptacle. Conversely, excess electrolyte may be withdrawn from the battery cell, if such is desired. This device has the serious disadvantage of lack of control, and with it, batteries are aften overfilled or underfilled, as the only indication of liquid level is the view which the operator may have through the filling opening beside the syringe stem.

In case of overfilling the excess electrolyte is subsequently sprayed out of the vent opening in the cell plug by the "gassing" of the electrolyte and accumulates on the metal brackets or supports of the battery, as well as on the terminals and cables, causing them to corrode rapidly. If the electrolyte is not carried at a high enough level above the plates of the battery, usually one-half inch, the decomposition of the water in the electrolyte due to normal charging and discharging, causes the active elements to become exposed, resulting in sulphating, heating, and buckling of the plates.

It is an object of this invention to provide an improved battery filler which will automatically prevent too high an electrolyte level above the plates in the cell.

Another object is to provide an improved battery filler which may be used to withdraw battery electrolyte and automatically leave the proper amount in the cell.

Another object is to provide a device which may be used to add to or withdraw liquid from a receptacle, and automatically establish the level of liquid remaining at a given height above an abutment in said receptacle.

These and other objects and advantages of this invention will become apparent from the description which follows, and from the accompanying drawings, which form a part of this specification and illustrate a preferred embodiment of this invention and an alternative form for a more limited application.

Figure 1:
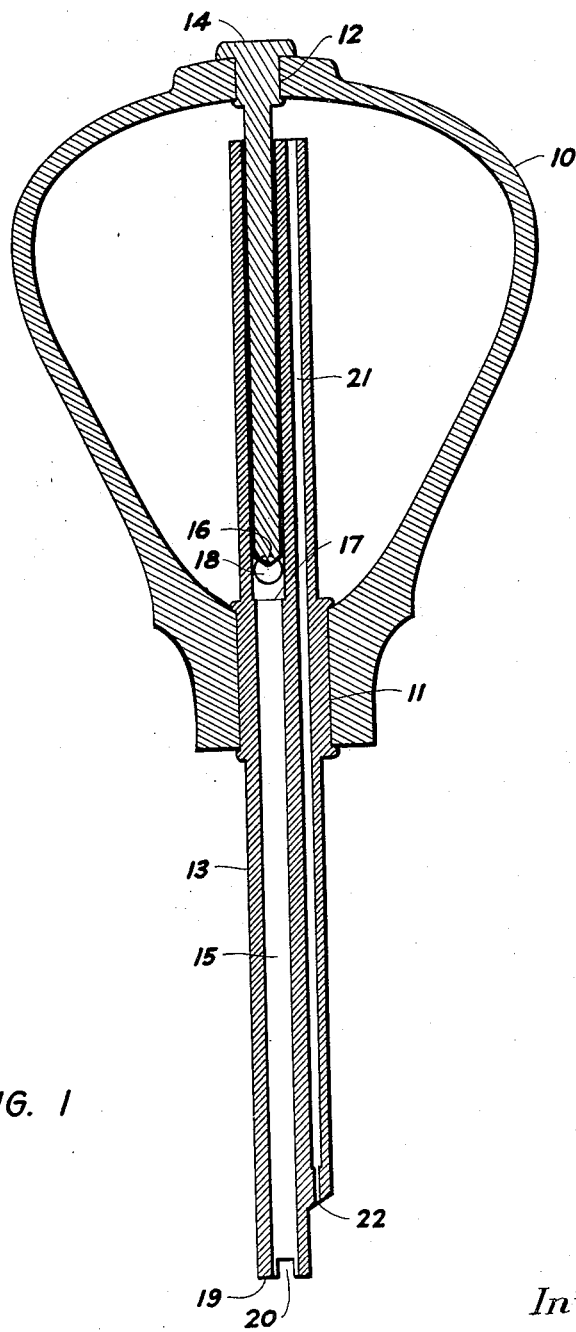
Figure 1 is a longitudinal sectional view of a device embodying this invention and utilizing a resilient bulb, which is adapted either to add or withdraw liquid from a receptacle.

Referring to Figure 1, the numeral 10 designates a closed container which is a bulb of soft rubber, provided at the bottom with an opening 11 and at the top with an opening 12. Stem 13, which may be of hard rubber, passes through the lower opening 11 and makes a fluid tight joint therewith. Valve member 14 is similarly mounted in the upper opening 12 and extends inwardly into the bulb and into the upper end or guide portion of fluid passage 15 in stem 13. The lower end of member 14 may be tapered as shown at 16 to form a valve plug, which is adapted to seat on a shoulder 17 in the bore of fluid passage 15. A port 18 through the wall of stem 13, immediately above the shoulder 17, provides a fluid passageway between the interior of bulb 10 and passage 15.

Valve member 14 with its plug 16 is normally retained in the open position shown by the normal resiliency of bulb 10, thus allowing free flow of fluid from the bulb through port 18 and passage 15 to the tip 19 of stem 13. The tip 19 may be slotted as at 20 to allow liquid flow in case the end of stem 13 is set squarely upon a flat surface.

Stem 13 is also provided with a second passage or air vent 21, which extends from the upper end of the stem, above any normal liquid level in the bulb, to a point 22 spaced somewhat above the tip 19. Air vent 21 is generally smaller in diameter than fluid passage 15, say $\frac{1}{16}$ inch as compared to $\frac{3}{16}$ inch, and may be further constricted to $\frac{1}{32}$ inch for a short distance above its lower end. The spacing between the lower end 22 of vent 21 and the tip 19 of stem 13 determines the height of liquid level to be automatically established above the point on which 19 rests. In the case of a syringe for battery filling, this distance may be ½ inch, but it is obvious that it could be materially changed to suit other conditions. Two tubes or conduits could be substituted for the single stem 13. Also, the valve 16 and shoulder 17 could be located adjacent the end 19 of passage 15, if such were desired.

In operation, where the electrolyte level in a battery, for example, is less than ½ inch above the plates and it is desired to add distilled water, the following steps are followed. Bulb 10 is partially collapsed by squeezing radially with the hand, and the tip 19 of stem 13 is immersed in a suitable supply of distilled water (not shown). The radial pressure on the bulb 10 is released, whereupon the resilient bulb walls will tend to resume their normal position, drawing water through passage 15 and port 18 into the bulb. The top of the bulb is depressed with regard to its main portion, forcing member 14 downwardly and seating valve plug 16 on shoulder 17. The stem 13 can then be withdrawn from the water supply and no liquid will flow out through passage 15 due to the valve 16 being closed on its seat.

The tip 19 of stem 13 is placed through the filling opening of the battery cell (not shown) and is allowed to seat on the top of the plates. The top of bulb 10 is released, thus allowing member 14 to be lifted by the resilient bulb walls, raising valve 16 from its seat on shoulder 17 and allowing water to flow from the interior of bulb 10 through port 18 and passage 15 into the battery. As the water flows under gravity head out of the bulb it is replaced by air which enters the bulb through air vent 21.

As soon as the liquid in the battery cell rises to cover the lower end 22 of air vent 21, no more water can flow out of bulb 10, and thus the level of the liquid is automatically established at ½ inch above the plates. The restricted diameter of air vent 21 prevents any substantial amount of liquid rising into that passage. The top of the bulb 10 may then be depressed, shutting off valve 16 and preventing leakage of water while the stem 13 is removed from the cell.

If there should be an excess of electrolyte in a cell, the empty bulb 10 is partly collapsed by squeezing radially, and the tip 19 of stem 13 is placed in the cell and in contact with the top of the plates. The walls of the bulb are released, whereupon liquid will be drawn from the cell into the bulb 10 under the vacuum produced by the resilient bulb. As soon as the level falls enough to uncover the end 22, of air vent 21, air will rapidly enter the bulb 10 above the liquid therein and relieve the vacuum so that no more liquid will be withdrawn. The situation is indicated to the operator by the sound of the air entering the vent 21. Valve 16 is then seated by pressing down on the top of bulb 10, whereupon the stem 13 may be withdrawn from the cell and the trapped liquid discharged into a suitable receptacle.

Figure 2:
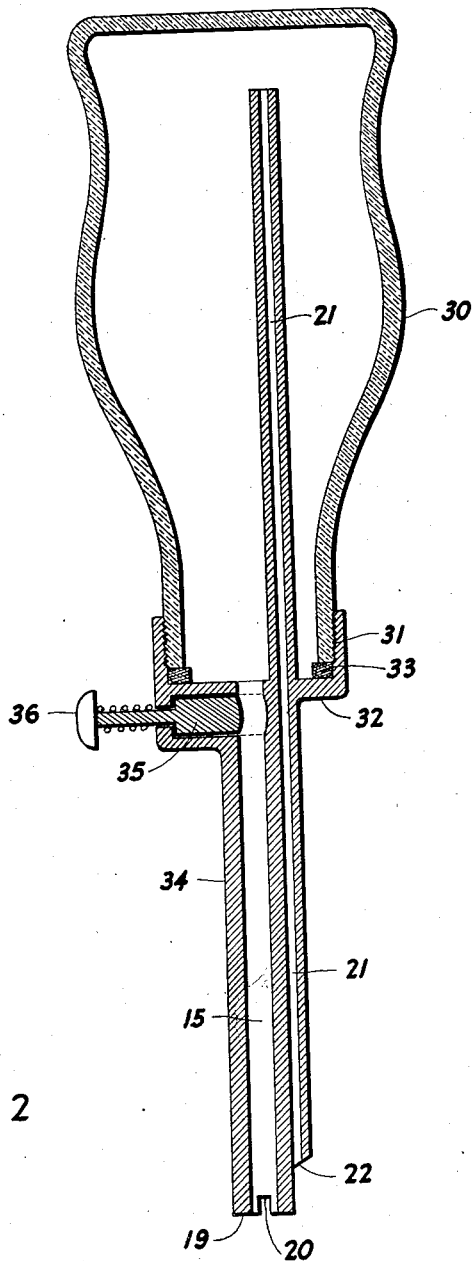
Figure 2 is a longitudinal sectional view of a filler embodying this invention, in which a rigid container is used, and which is adapted only to fill a receptacle.

Figure 2 illustrates a modified form of device, adapted for filling only. The only essential difference is in the substitution of a rigid container 30, which may be a glass jar as shown, for the resilient bulb 10 of Figure 1. The filling opening of the jar 30 may be provided with a threaded connection 31, onto which a molded composition or metal cap 32 may be screwed, with a gasket 33 to prevent leakage. Cap 32 is provided with an outwardly extending stem 34, through which is a passage 15 for outflowing liquid, passage 15 being fitted with a control valve 35 externally operated by means of the button 36. Air vent conduit 21 extends from a point 22, spaced from the end 19 of stem 34, through cap 32 into the upper portion of jar 30.

The method of operation of this filler is quite similar to that outlined for the device in Figure 1, except that the cap 32 is removed to fill the jar with liquid, and the valve 35 is operated by hand or finger pressure on the button 36.

Thus it is seen that a new and improved battery filler has been described and illustrated, which utilizes gravity head to empty itself and automatically prevents further outflow by closing off the air supply to the liquid storage container when the proper liquid level has been reached in the vessel being filled. The valve constructions shown permit the stem of the filler to be withdrawn without leakage and allows the operation of controlled level filling to be repeated as long as there is sufficient liquid in the container. The reverse operation, that of withdrawing liquid to the level desired, requires a reduction in pressure in the container or storage chamber, and utilizes the same elements as were just enumerated and in the manner described.

It is obvious, therefore, that numerous modifications and changes could be made in the device without departing from the essential features of the invention. Although a specific construction embodying the invention has been described and illustrated, it is to be understood that the invention is not limited to that arrangement, and all such modifications and changes as come within the scope of the appended claims are embraced thereby.

I claim:

1. A battery filler and liquid level regulator, comprising a resilient bulb, a stem secured in one end of said bulb and extending outwardly therefrom, a passage in said stem extending from the outermost end thereof and communicating with the interior of said bulb, a valve in said passage, valve operating means in operable relation to the resilient wall of said bulb, a vent tube adjacent said stem, extending from a point spaced inwardly from the outermost end of said stem, and communicating with the interior of said bulb at the end opposite to that in which the said stem is secured, said bulb being adapted to create a suction to draw in liquid until air is admitted through said vent tube.

2. A battery filler and liquid level regulator comprising a resilient closed container, a stem passing into said container and extending outwardly therefrom, a passage for liquid extending from said bulb to the outer end of said stem, an air passage in said stem, the inlet of said air passage spaced from the end of said stem, a valve in said liquid passage and means to operate said valve attached to a resilient wall of said container, said container being adapted to create a suction to draw in liquid until air is admitted through said air passage.

3. A battery filler comprising a resilient closed container, a conduit extending from one end of said container, a second conduit extending into the opposite end of said container from a point adjacent the outer end of said first named conduit, and a valve in said first named conduit adapted to be operated by a movement of a wall of said container.

4. A portable liquid dispenser and level regulator comprising a closed resilient container for liquid, a valved liquid outlet conduit from said container, and a separate air inlet to said container, the outer end of said air inlet spaced from the discharge end of said liquid outlet conduit, said container being adapted to create a suction to draw in liquid until air is admitted through said air inlet.

5. A portable liquid dispenser and level regulator comprising a resilient bulb, a liquid conduit from said bulb and an air inlet to said bulb, the outer end of said air inlet being spaced from the end of said liquid conduit, said bulb being adapted to create a suction to draw in liquid until air is admitted through said air inlet, and means for preventing subsequent flow of liquid from said bulb.

GLENN T. MARLOWE.